Aug. 1, 1944.  B. F. McNAMEE  2,354,923
FRICTIONAL RESISTANCE TESTING APPARATUS
Filed Jan. 7, 1941    2 Sheets-Sheet 1

Inventor
BERNARD F. McNAMEE
By Lyon & Lyon
Attorneys.

Aug. 1, 1944.  B. F. McNAMEE  2,354,923
FRICTIONAL RESISTANCE TESTING APPARATUS
Filed Jan. 7, 1941  2 Sheets-Sheet 2

Inventor
BERNARD F. McNAMEE
By Lyon & Lyon
Attorneys.

Patented Aug. 1, 1944

2,354,923

UNITED STATES PATENT OFFICE 2,354,923

FRICTIONAL RESISTANCE TESTING APPARATUS

Bernard F. McNamee, Los Angeles, Calif., assignor to The Superior Oil Company, Los Angeles, Calif., a corporation of California Application January 7, 1941, Serial No. 373,394

10 Claims. (Cl. 265—11)

This invention relates, generally, to the art of testing and measuring, and has particularly to do with measuring effects the values of which are determined not only by a factor sought to be evaluated, but also by extraneous factors, such as speed. Thus, for example, a convenient method of determining the viscosity of a liquid is to move a body through the liquid, and measure the resistance to movement afforded by the liquid; the resistance to motion being affected not only by the viscosity of the liquid but also by the speed at which the body is moved, so that the reading of the resistance does not give a useful indication of the viscosity unless the effect of the speed is known. With such apparatus, changes in viscosity of a liquid can be accurately detected by maintaining the speed of the body constant, and apparatus has been developed, heretofore for measuring viscosity, in which the body is moved at a constant speed by a constant speed motor. Unfortunately, however, it is sometimes difficult or impracticable to provide a suitable, constant speed motor.

An important object of the present invention is to provide for the making of tests in which speed is a factor without the necessity of employing a constant speed driving motor.

Another object is to provide practicable apparatus for obtaining readings at a plurality of speeds, when making tests in which speed is a factor affecting the results.

Another object is to provide apparatus suitable for measuring the viscosity of suspensions or colloidal solutions at extremely low speed of shear by means of a moving body in the solution. Heretofore difficulty has been encountered in making such measurements because of the tendency of colloidal solutions and suspensions to accumulate on and clog the testing element moving therein.

Other more specific objects, together with numerous features of the invention, will appear from the following detailed description, with reference to the drawings, of certain specific embodiments of the invention.

Figure 1:
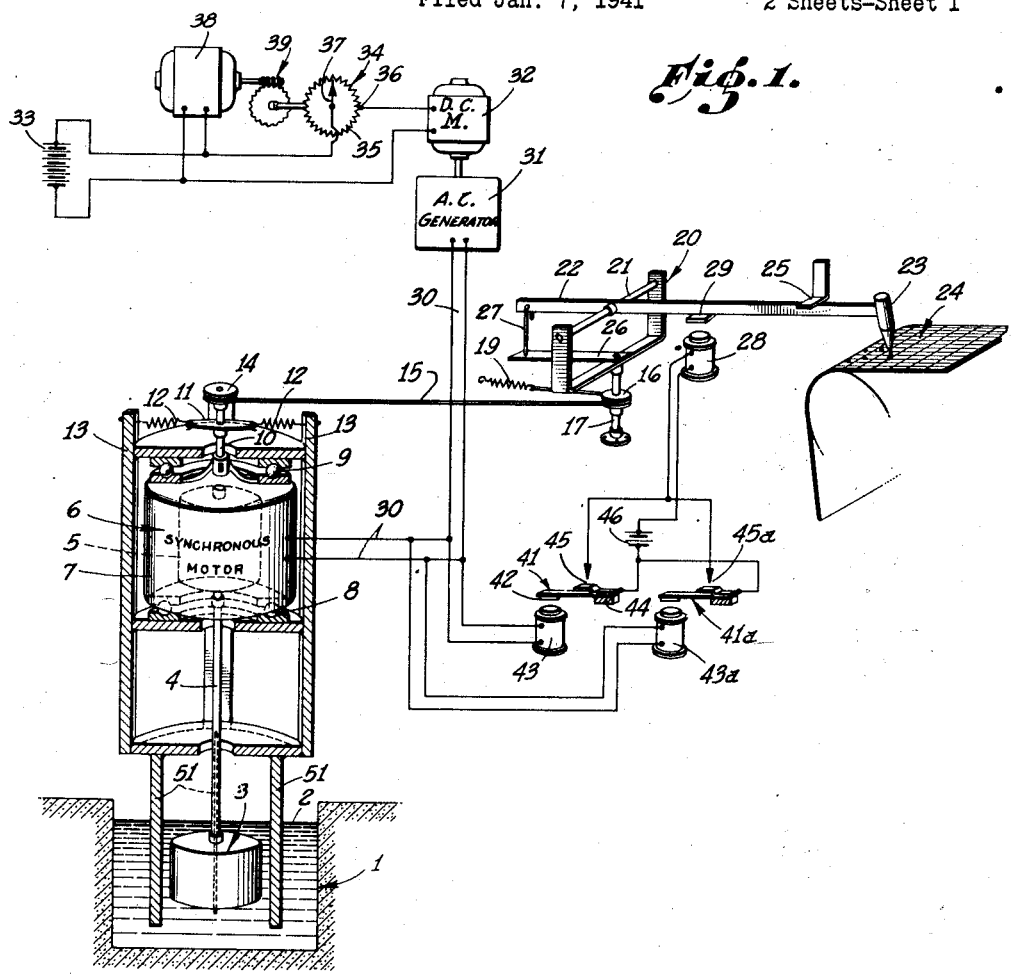
Fig. 1 is a schematic diagram of apparatus in accordance with the invention, for measuring the viscosity of a liquid and recording it on a moving record.

Referring first to Fig. 1, there is disclosed a trough 1 through which flows a liquid 2, the viscosity of which is to be continually recorded. The apparatus for determining and recording the viscosity of the liquid 2 comprises, as an essential element, a drum 3 which is completely immersed in the liquid 2 and is rotated. The liquid 2 places a frictional load on the drum, which load varies with the speed of rotation of the drum and the viscosity of the liquid 2 and manifests itself as a braking torque on the drum. Obviously, by continuously measuring and recording the torque required to rotate the drum at a constant speed, a record of changes in viscosity of the liquid will be obtained. It has heretofore been proposed to rotate the drum at a constant speed by connecting it to the rotor of a synchronous motor energized from a source of alternating current of constant frequency, and measure the torque by supporting the stator of the rotor for free rotation against a restraining spring and recording movements of the stator. In accordance with the present invention, I employ a motor having a rotor connected to the drum 3 and a movable stator which rotates in response to variations in torque to actuate a recording pen, but instead of driving the motor at a constant speed I drive it at a continually varying speed and sensitize the recording pen to record only when the drum 3 is moving through a particular speed.

Thus as shown in Fig. 1, the drum 3 is suspended by a shaft 4 from the rotor 5 of a synchronous motor 6, the stator 7 of which is supported by ball bearings 8 and 9 for rotary movement. The rotor 5 is rotatably supported from the stator 7 by the usual motor bearings (not shown in the drawings). To prevent the rotating drum 3 from creating a whirl or eddy in the liquid 2, stationary vanes 51 are extended down into the liquid 2 quite closely adjacent the periphery of the drum. To restrain the stator 7 against free rotation, the latter is connected to an axial shaft 10 extending upwardly from the stator and having a cross bar 11, the ends of which are connected by tension springs 12 to a pair of stationary frame members 13. These springs 12 prevent free rotation of the motor stator but permit it to shift through a limited range of angular movement in response to variations in the frictional resistance to rotation of the drum 3.

Angular movement of the stator is transmitted through a pulley 14 on the shaft 10, a cord 15, and a pulley 16, to a vertical shaft 17, which is supported in suitable stationary bearing means for free rotation. The cord 15 is maintained in taut relation about the pulley 16 by a tension spring 19.

Connected to the upper end of the shaft 17 is a yoke 20 between the two arms of which there is pivotally supported a horizontal shaft 21, to which there is attached a pen beam 22 having a pen 23 positioned at one end and normally held just out of contact with a moving paper tape 24. The upper position of the pen is determined by a stop 25 against which the beam 22 rests, and the beam is normally held in the inactive position by a leaf spring 26 extending from the yoke 20 and connected to the rear end of the beam 22 by a link 27. The pen can be moved downwardly to contact the paper tape 24 and record thereon, by sensitizing an electromagnet 28 positioned below the beam and cooperating with an armature 29 secured to the beam. In the operation of the device, the motor 6 is driven at a continually varying speed and the magnet 28 is energized to move the pen 23 against the paper tape only when the motor passes through a predetermined speed or speeds at which it is desired to take readings.

In the particular system shown in Fig. 1, the synchronous motor 6 is driven at a continually varying speed by energizing it from a source of alternating current of varying frequency, and the magnet 28 is energized by a frequency sensitive contact mechanism only when the frequency of the current supplied to the motor 6 passes through a value or values corresponding to the speed or speeds at which the viscosity is to be measured.

Thus the synchronous motor 6 is connected by a line 30 to an A. C. generator 31 which is driven directly from a D. C. motor 32 energized from a suitable source of D. C., indicated as a battery 33, through a variable resistance or rheostat 34. As shown, the rheostat 34 comprises a circular resistance element 35 connected at one point 36 to one terminal of the motor 32, and has associated therewith a rotatable contact 37 which is connected to one side of the battery 33. The other side of the battery 33 is permanently connected to the other terminal of the motor 32, so that the value of the current supplied from the source 33 to the motor 32 will be continually varied between predetermined limits in response to rotation of the movable contact 37. This contact is continually rotated as by a motor 38 acting through a worm and gear mechanism 39. The motor 38 and the reduction gear 39 can be conveniently designed to cause the contact 37 to rotate at any desired speed.

In the present apparatus, a useful speed of rotation of the contact 37 may be one revolution per minute. Therefore, the A. C. generator 31 will supply current of a frequency that is continually changing from a minimum value to a maximum value and back again to minimum, once during each minute, and will drive the synchronous motor 6 at a correspondingly varying speed. Assuming that there is no change in the viscosity of the liquid 2, the varying speed of the motor 6 will cause the reactive torque applied to the drum 3 by the liquid 2 to vary, and this torque will be applied from the startor 7 of the motor 6 through the coupling cord 15 to the pen mechanism and cause the pen 23 to swing continually back and forth over the paper tape 24 in a path indicated by the dotted line 40 in Fig. 2. However, this line 40 will not be recorded on the tape 24 by the pen 23 since the pen is normally held out of engagement with the paper tape by the leaf spring 26.

To pull the pen into engagement with the paper tape when, and only when, the drum 3 is rotating at a desired predetermined speed, I utilize an energizing circuit for the magnet 28 including a tuned reed 41 having an armature 42 secured thereto, which armature is positioned adjacent an electromagnet 43 connected to the alternating current line 30. The reed 41 is rigidly supported at one end on a suitable support 44 and has a very sharp frequency characteristic so that it is only slightly affected by the magnet 43 except when the latter is energized at a frequency corresponding to the natural frequency of the reed. However, the reed then vibrates through a wide amplitude to close and open contacts 45 connected in series with the magnet 28 and a source of current 46, energizing the magnet 28 to attract the armature 29 and pull the pen 23 into contact with the paper tape 24. As soon as the frequency of the alternating current varies from the natural frequency of the reed 41, the latter ceases to vibrate, and the magnet 28 is de-energized, permitting the pen 23 to be again lifted clear of the paper tape. Although with the particular circuit shown the magnet 28 would not be continually energized, the inertia of the beam 22 and the armature 29 is such as to prevent the beam from moving in synchronism with the vibration of the reed 41, and the pen 23 is held against the paper so long as the reed 41 vibrates.

Figure 2:
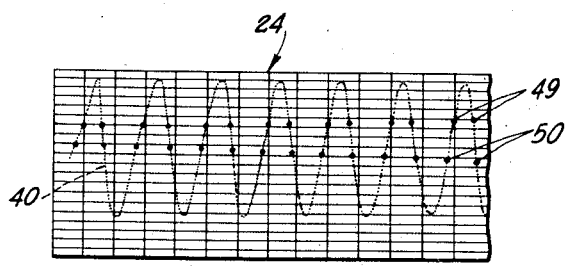
Fig. 2 is a view showing a section of tape recorded with the apparatus of Fig. 1, and showing the path of the recording pen as well as the actual record made.

The net result of the operation of the apparatus including the reed 41 as described, is to cause the pen 23 to record a dot on the paper tape 24 each time the speed passes through the particular value corresponding to the frequency of vibration of the reed 41, and a series of dots corresponding to the dots 49 in Fig. 2 will be recorded on the paper tape. If the viscosity of the liquid 2 remains the same, the dots 49 will all lie in a straight line extending longitudinally of the tape. On the other hand, if the viscosity increases or decreases as time goes on, the dots 49 will define a curve representative of the changes in viscosity.

In Fig. 2 the curve defined by the dots 49 gradually rises, indicating an increase in apparent viscosity of the liquid 2.

The apparatus described has the very important advantage that it produces accurate readings of the torque required to rotate the drum 3 at a particular speed, without the necessity of employing a constant speed motor.

An additional advantage is that the construction makes it possible to obtain simultaneously a plurality of readings at different speeds. Thus by simply employing a duplicate reed 41a tuned to oscillate at a different frequency than the reed 41, actuating the reed 41a by a magnet 43a connected in parallel to the magnet 43, and having the reed 41a actuate a duplicate set of contacts 45a connected in parallel to the contacts 45, the pens 23 will be pulled into contact with the paper tape each time the drum 3 passes through the speed corresponding to the natural frequency of the reed 41a, thereby producing a second series of dots 50 on the paper tape, (Fig. 2) which dots define a second curve indicative of the torque required to rotate the drum 3 at the second speed.

Obviously, any desired number of tuned reeds may be employed to record the reactive torque on the drum 3 at as many different speeds as may be desired.

In the making of viscosity tests with a drum submerged in a liquid as shown, a plurality of readings taken at different speeds of the drum sometimes give valuable information that is unobtainable from readings taken at only a single speed.

The apparatus also has a unique advantage over constant-speed devices when testing the viscosity of a gelatinous suspension or a colloidal suspension, such as drilling mud, in that it permits the taking of accurate measurements at lower speeds than are possible when the drum is rotated continuously at the measuring speed. This is for the reason that gelatinous or colloidal suspensions tend to deposit solid matter on a drum rotated at very low speeds, and such accumulations obviously change the resistance to rotation of the drum. In my apparatus, in which the drum speed is continually varied between an upper and a lower limit, any small amounts of solid matter accumulating on the drum during the slow part of the cycle are thrown off the drum during the fast part of the cycle. Hence the drum periodically cleans itself. In other words, the drum is periodically slowed up long enough to get a viscosity reading at the desired low speed but not long enough to accumulate solid matter, which it would do if run continuously at the said low speed.

Figure 3:
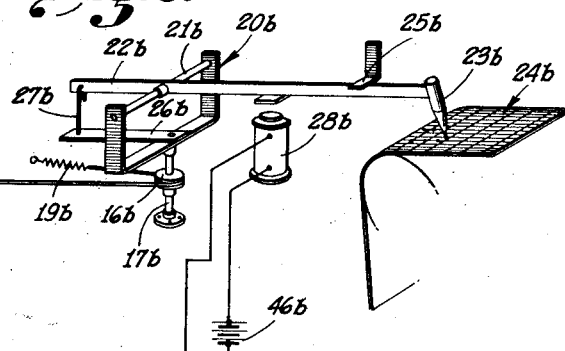
Fig. 3 is a schematic diagram illustrating a modified form of the apparatus shown in Fig. 1.

The system of Fig. 1 incorporates a motor generator set including the D. C. motor 32 and the A. C. generator 31. It is possible to simplify the apparatus and eliminate the motor generator set by providing some auxiliary device for actuating the reed or reeds. One way in which this can be done is shown in Fig. 3, in which parts corresponding to the same parts in Fig. 1 bear the same reference numerals with the suffix b. It will be observed that the motor 6b in Fig. 3 is a D. C. motor instead of an A. C. synchronous motor, and is energized directly from the battery 33b through the varying rheostat 34b. In this instance, the magnet 28b is energized from the battery 46b through contacts 45b and 45ab on reeds 41b and 41ab corresponding to the reeds 41 and 41a of Fig. 1. However, in Fig. 3 the reeds 41b and 41ab have their armatures 42b juxtaposed to the periphery of a toothed rotor 60 of iron or other paramagnetic material secured to the shaft 4b. There is also positioned adjacent the armature 42b of reed 41b, a permanent magnet 61, and adjacent the armature 42b of the reed 41ab a permanent magnet 61a. The magnetic circuit of the permanent magnet 61 is completed through the rotor 60 to the armature 42b so that each time a tooth of the rotor 60 passes the armature 42b it attracts it, and when the teeth pass the armature at a predetermined speed, for which it is tuned, the armature is set in vibration to close its contact 45b and energize the magnet 28b. The reed 41ab functions in a similar manner, but it is tuned to a frequency different from that to which the reed 41b is tuned, so that it closes its contact to energize the magnet 28b at the different frequency.

Figure 4:
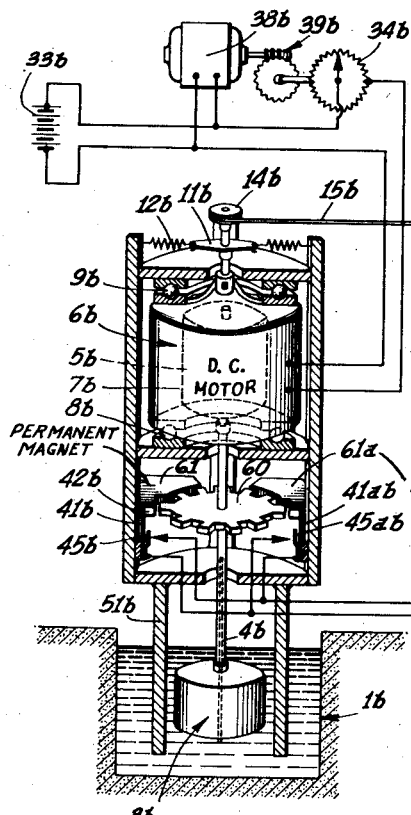
Fig. 4 is a schematic diagram, showing a system in accordance with the invention, for indicating the density of a liquid.
Figure 4:
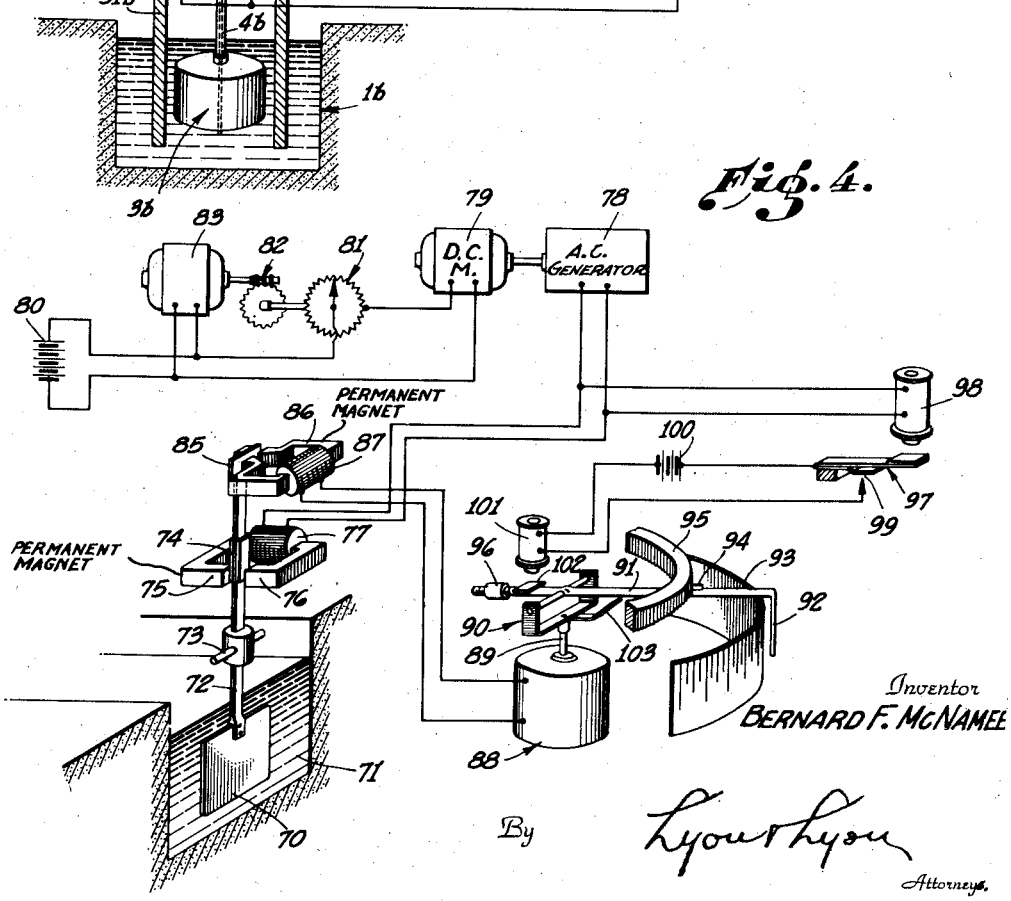

The invention is not limited to the making of viscosity measurements, nor is it limited to recording on a paper tape. Thus an application of the invention for the indication of variations in density of a liquid is illustrated in Fig. 4, which discloses a paddle 70 submerged in a liquid 71 to be tested and supported on the lower end of a lever 72 having a fulcrum pin 73 adapted to be supported in a bearing (not shown). The lever 72 extends upwardly above the fulcrum pin 73 and has a permanent magnet 74 secured thereto, the lower end of which is positioned between the pole pieces 75 and 76 of an electromagnet 77, which is energized by current from an A. C. generator 78 driven by a D. C. motor 79. As shown in Fig. 4, the D. C. motor 79 is actuated at a varying speed by current from a battery 80 controlled by a varying rheostat 81 actuated through a reduction gear 82 from a motor 83. This drives the A. C. generator 78 at a varying speed to apply an alternating current of continually varying frequency to the electromagnet 77 to set up an alternating magnetic flux between the pole pieces 75 and 76. This alternating flux reacts with the lower end of the permanent magnet 74 positioned therebetween to vibrate the lever 72 about its fulcrum pin 73.

The amplitude of vibration of the lever 72 is limited by a number of factors, the chief of which is the resistance to movement of the paddle 70 afforded by the liquid 71 in which it is immersed. It has been discovered that the resistance to vibration of the paddle depends to a large extent, upon the inertia of the liquid, which in turn is a function of the density of the liquid. Hence the amplitude of vibration of the lever 72 at any particular frequency can be used as a measure of the density of the liquid.

To measure the amplitude of vibration of the lever, the latter may have secured to its upper end an armature 85 associated with a permanent magnet 86 having a coil 87 thereon, which coil is connected to an alternating current meter movement 88. As the armature moves toward and away from the pole pieces of the permanent magnet 86, it varies the strength of the magnetic flux in the magnet to induce currents in the coil 87, and the strength of the current at any particular frequency is a function of the amplitude of vibrations of the lever 72.

The meter movement 88 has a shaft 89 extending therefrom which supports, by means of a yoke 90, a lever 91, which lever is bent down at one end to constitute a hand 92 movable across a scale 93. If unrestricted, the hand 92 would always occupy a position on the scale 93 corresponding to the amplitude of the alternating current flowing through the meter movement 88.

However, the value of the current delivered to the meter movement 88 affords a useful indication of the density of the liquid 71 only when the frequency of vibration of the lever 72 is known, and a mechanism is therefore provided which restrains the hand 92 from moving in accordance with variations in the current in the meter movement 88 except when the lever 72 is oscillating at a predetermined frequency.

Thus, the lever is normally restrained against rotation by engagement of a knife edge 94 on the lever against the corrugated under edge of an arcuate stop member 95, the lever being yieldably urged against the stop by the weight of an adjustable counterbalance 96 on the rear end of the lever. However, when the frequency of the driving current for the lever 72 passes through a predetermined value, a vibratory reed 97 is energized by an electromagnet 98 connected to the A. C. generator 78, causing the reed to intermittently close the contacts 99 and supply current from a battery 100 to an electromagnet 101 positioned above an armature 102 secured to the rear end of the lever 91. The tractive force of the magnet 101 on the armature 102 lifts the rear end of the lever 91 and thereby drops the knife edge 94 on the lever away from the stop member 95, permitting the lever to move into position corresponding to the magnitude of the alternating current being delivered at that time to the meter movement 88. As soon as the frequency passes beyond the value for which the reed 97 is tuned, the contacts 99 open to de-energize the magnet 101 and permit the counterbalance 96 to again engage the knife edge 94 with the stop 95, so that the hand 92 will not respond to the current supplied to the meter movement 88.

The movable element of the rheostat 81 can be driven at a speed sufficient to energize the magnet 101, and thereby sensitize the meter movement at relatively short intervals. In most applications the density of the liquid 71 does not change very rapidly so that any lag in the response of the apparatus would ordinarily be negligible.

Downward movement of the forward end of the lever 91 may be limited by contact against a stop member 103 mounted on the yoke 90 when the magnet 101 is energized.

It should be noted particularly, with respect to all the different embodiments of the invention that have been described, that the minimum and maximum frequencies or speeds employed are not critical. It is merely necessary that they cover a sufficient range to insure that the maximum speed or frequency would in all cases exceed, and that the minimum speed or frequency will always be less than, the speed or frequency at which measurements are desired.

As an example, in the modification shown in Fig. 1, the motor 32 should be so designed that when the rheostat 34 is in the position of minimum resistance the speed of the motor 32, the motor 6 and the drum 3, is higher than that required for any desired measurement even when the voltage of the battery 33 is at its lowest value. The resistance value of the rheostat 34 is then so chosen that even at the highest battery voltage it will reduce the drum speed to a value lower than the lowest speed at which it is desired to make measurements. The same rules apply to the design of the apparatus shown in Figs. 3 and 4.

Thus in both the apparatus of Fig. 1 and that of Fig. 3, the resistance to rotation of the drum produced by the liquid is measured by floating the stator of the motor and measuring the reactive torque applied to the stator. However, numerous other methods are in use for measuring the magnitude of the friction between a drum and the liquid in which it is immersed, and my invention is useful with such methods.

Although for the purpose of fully explaining the invention several specific embodiments of the invention have been described in detail, it is to be noted that the invention is in no sense limited to the exact apparatus shown, but only to the extent indicated in the appended claims.

I claim:

1. In measuring apparatus having means for evaluating an effect, which means incorporates a moving element the speed of which is a factor influencing the extent of response of said evaluating means to said effect: means for driving said element at a variable speed, varying above and below a chosen speed at which a measurement is desired, and means controlled by the speed of said element for producing an indication of the response of said evaluating means only when said element is moving at said chosen speed.

2. In apparatus for indicating the value of a resultant of a plurality of controlling factors, one of which factors is speed and another of which is a factor to be measured: testing means, means for moving said testing means at a speed continually varying above and below a predetermined speed, indicating means actuated by said testing means and responsive in the same way to both the said factor to be measured and the speed of said testing means, and means responsive solely to the speed of said testing means for rendering said indicating means operative only when said testing means is at said predetermined speed.

3. Apparatus as described in claim 1, in which said means controlled by the speed of said element includes a resonant tuning means.

4. Apparatus as described in claim 1, in which said means controlled by the speed of said element includes a vibratory means having a resonant frequency corresponding to said chosen speed, and means movable in synchronism with the speed of said element for exciting said vibratory means.

5. In apparatus for recording the value of a resultant of a plurality of controlling factors one of which is speed: a record sheet, a pen for marking on said record sheet, testing means, means for moving said testing means at a speed continually varying above and below a chosen speed, means actuated by said testing means and responsive in the same way to both the factor to be measured and to the speed of said testing means for effecting relative movement between said pen and sheet in a direction parallel to said sheet, means normally maintaining said pen out of writing engagement with said sheet, and means responsive to the speed of said testing means for moving said pen into writing engagement with said sheet only when said testing means is at said chosen speed.

6. In apparatus for recording the value of a resultant of a plurality of controlling factors one of which is speed: a record sheet, a pen for marking on said record sheet, testing means, means for moving said testing means at a speed continually varying above and below a chosen speed, means actuated by said testing means and responsive in the same way to both the factor to be measured and the speed of said testing means for effecting relative movement between said pen and sheet in a direction parallel to said sheet, and means for effecting relative movement between said sheet and pen to produce a mark on said sheet indicative of the relative position of said pen to said sheet in said second direction when said testing means is at said chosen speed.

7. In measuring apparatus having means for evaluating an effect, which means incorporates a moving element the speed of which is a factor influencing the response of said means to said effect: means for driving said element at a variable speed, varying above and below a chosen speed at which a measurement is desired; said evaluating means including a movable indicating device and means for moving it both in response to said effect and to the speed of said moving element, and means actuated by the speed of said element for conditioning said indicating device for movement only when said element is moving at said chosen speed.

8. Apparatus for measuring physical characteristics of a fluid comprising: a member submersible in the fluid and movable through a predetermined path in the fluid, means responsive to both the speed of said member and to a physical characteristic of the fluid in which it is immersed for producing an indication, means for normally disabling said indicating means, speed-responsive means for enabling said indicating means when, and only when, said movable element is moving at a chosen speed, and means for driving said movable member at varying speeds varying between limits below and above said chosen speed.

9. Apparatus as described in claim 8, for measuring physical characteristics of a fluid medium capable of depositing material on said member at a chosen low speed of measurement in which the upper speed limit of said movable member is sufficiently high to throw off material accumulated at the chosen speed.

10. Measuring apparatus comprising in combination: means for evaluating an effect, which means incorporates a moving element the speed of which is a factor influencing the response of said means to said effect, said evaluating means including an indicating means movable both in response to the speed of said moving element and to the effect to be evaluated, means normally disabling said indicating means, means for driving said element including an A. C. synchronous motor and a source of energizing current therefor of varying frequency, and auxiliary means energized from said source of alternating current of varying frequency for enabling said indicating means in response to alternating current of a chosen frequency.

BERNARD F. McNAMEE.